Aug. 18, 1964    H. C. LEONARD ETAL    3,145,259
THREE PHASE ELECTRICAL POWER DISTRIBUTION SYSTEM
Filed Jan. 7, 1963    5 Sheets-Sheet 2

INVENTORS
HAROLD C. LEONARD
VARDAMAN K. SMITH

BY Strauch, Nolan & Neale

ATTORNEYS

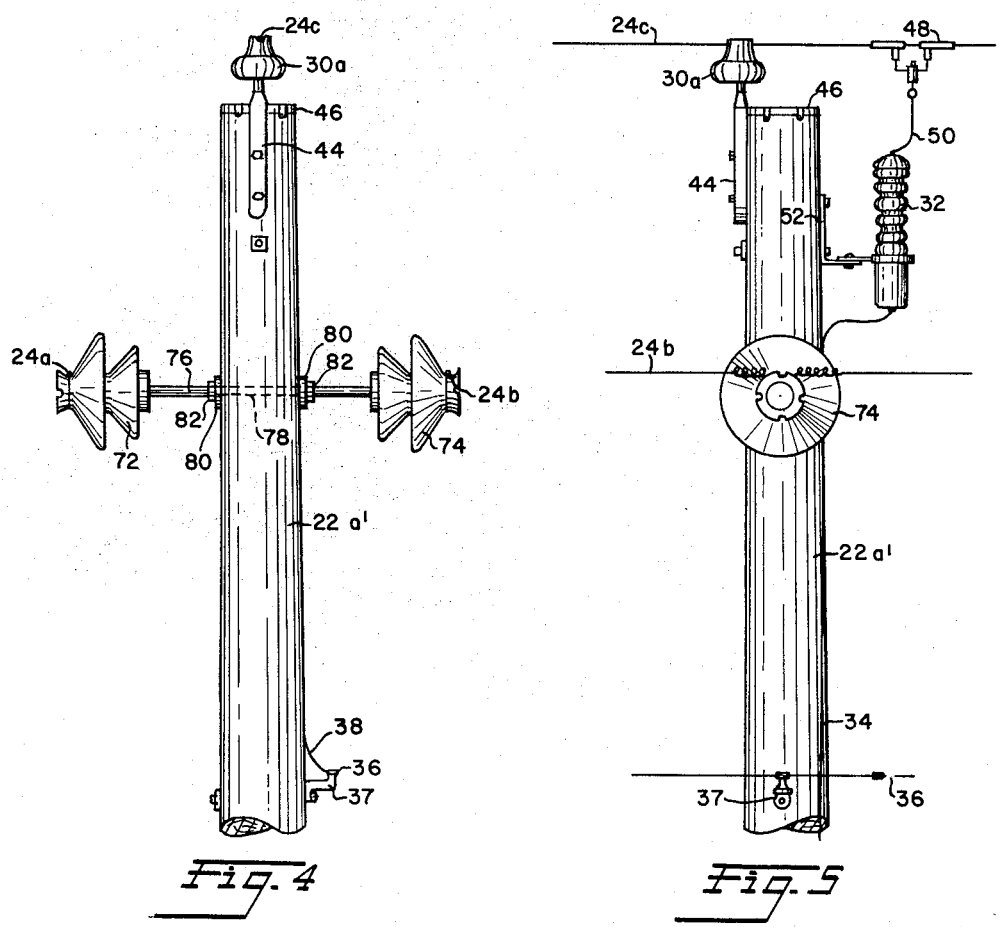

Aug. 18, 1964 H. C. LEONARD ETAL 3,145,259
THREE PHASE ELECTRICAL POWER DISTRIBUTION SYSTEM
Filed Jan. 7, 1963 5 Sheets-Sheet 4

INVENTORS
HAROLD C. LEONARD
VARDAMAN K. SMITH
BY Strauch, Nolan & Neale
ATTORNEYS Aug. 18, 1964  H. C. LEONARD ETAL  3,145,259
THREE PHASE ELECTRICAL POWER DISTRIBUTION SYSTEM
Filed Jan. 7, 1963  5 Sheets-Sheet 5

INVENTORS
HAROLD C. LEONARD
VARDAMAN K. SMITH

BY Strauch, Nolan & Neale

ATTORNEYS

United States Patent Office 3,145,259
Patented Aug. 18, 1964

3,145,259
THREE PHASE ELECTRICAL POWER
DISTRIBUTION SYSTEM
Harold C. Leonard, Electric Bldg., Jackson 5, Miss., and
Vardaman K. Smith, Jackson, Miss.; said Smith assignor to said Leonard
Filed Jan. 7, 1963, Ser. No. 249,813
9 Claims. (Cl. 174—43)

This invention relates to electrical distribution systems and, more specifically, to electrical distribution systems of the overhead type.

Electrical energy is normally transmitted at extremely high voltages in three-phase form to a substation located in the area to be served by a particular transmission line where the electrical energy is stepped down to a voltage on the order of 2–35 kv. From the substation a distribution system carries the stepped down electricity throughout the service area. At the consumer situs the electrical energy is again stepped down by a distribution transformer to a voltage directly usable by the customer. For residential or light commercial use, for example, the distribution transformer may have an output of 208 volts or 240 volts, making either three-phase 208 volt motor power or single-phase 120–240 volt lamp power available to the consumer.

Most distribution systems are of the conventional overhead type in which the three primary conductors carrying three-phase electrical energy are supported from horizontally extending wooden cross arms mounted adjacent the upper ends of utility or distribution poles. These cross arms are normally 6–10 feet long and, especially with conductors strung on them, have a cluttered unsightly appearance. This is a decided detriment, especially in residential neighborhoods. Utility companies have therefore expended substantial amounts of time and money in efforts to provide more attractive systems for such areas.

One manner in which the appearance problems may be solved is to place the distribution system underground. Underground systems, however, are many times as expensive to construct as overhead systems and, therefore, are under most circumstances economically infeasible.

A less expensive (and less satisfactory) prior art solution to the problem of unsightly distribution systems resides in the use of spacer cable type overhead systems. Although such systems are somewhat more attractive than the conventional overhead systems, the erection cost of such a system is typically two times as great as the cost of a comparable conventional system. Such systems have, therefore, been only infrequently employed.

Various types of armless distribution systems in which conductor supporting insulators are mounted directly on the utility poles have also been proposed. Although such systems have on occasion been employed in special purpose applications, they are not suitable for general use. The prior art armless distribution systems almost invariably require excessively high poles. In addition, the conductors are so arranged relative to the poles that it is difficult to make connections to pole-mounted distribution transformers. Further, the prior art armless distribution systems have inadequate climbing space between the primary conductors, rendering it hazardous for a lineman to make his way past the lower conductors to those at a higher elevation.

The present invention provides a significantly improved three-phase overhead distribution system of the armless type. In this novel system two primary conductor supporting insulators are mounted in horizontally aligned, back-to-back relationship adjacent the top of each utility pole and extend in opposite directions therefrom. A third primary conductor supporting insulator is fixed to and extends upwardly from the top of the pole. The length of the insulators and their mounting locations are preferably so co-ordinated that, at each utility pole, the three conductors are located substantially at the corners of an equilateral triangle.

A number of important advantages are obtained from this novel construction. Applicants' system is more attractive than the conventional or spacer cable systems since the brackets, braces, cross arms, etc. employed in these systems are eliminated. It is less expensive than underground or spacer cable systems and compares favorably in cost with shielded systems in which a fourth conductor is strung above the cross arms of a conventional overhead system to protect the cross arm mounted primary conductors against lightning.

The system provided by the present invention is highly resistant to lightning and does not require the use of a shielding conductor. Instead, lightning protection may be readily an inexpensively provided by connecting a single lightning arrestor to the upper conductor at each utility pole or, in some circumstances, alternate or even more distantly spaced poles. As a result of eliminating the shielding conductor, substantially shorter poles may be employed, further increasing the attractiveness of the system.

Applicants' novel system provides climbing space between the primary conductors which more than meet the minimum safety requirements of the American Standards Association and which is substantially greater than in conventional systems. At the same time, necessary connections to distribution transformers and other system components can be easily and safely made.

Because of the equidistant spacing of the conductors, the novel system of the present invention has a balanced voltage drop, eliminating the overheating of polyphase motors caused when the voltages of the different phases of the electrical energy supplied to the motor are not equal. In addition, it has a lower impedance and, consequently, a greater current carrying capacity than the conventional systems in which the conductors are unequally spaced. Moreover, since the voltage drop is balanced, there is no need to transpose the conductors as has previously been done to equalize the voltage drops in the different phases as much as possible. In addition the novel system of the present invention has a high impulse withstand and, consequently, is less apt to flash over than conventional overhead systems. Applicants' novel system is, in addition, less prone to outages caused by short circuit galloping and high winds.

A further feature of applicants' novel system is that the spacers heretofore utilized in conjunction with tree wire and semi-insulating conductors are not necessary. In addition, applicants' novel system is more flexible than the systems heretofore employed, permitting the use of a wide variety of post and pin type insulators, distribution transformers, and other system components. And, further, use can be made of existing poles in converting a conventional cross arm system to the novel system provided by the present invention.

In view of the foregoing, it will be apparent that one object of the present invention resides in the provision of novel improved overhead type electrical distribution systems.

Among the other objects of the present invention are the following:

(1) The provision of novel overhead type electrical distribution systems which have a more attractive appearance than those heretofore employed.

(2) The provision of novel electrical distribution systems which are less expensive to construct and maintain than those of the prior art.

(3) The provision of novel armless overhead type electrical distribution systems which have adequate climbing space and which facilitate the making of transformer and other system component connections.

(4) The provision of novel three-phase electrical distribution systems which have balanced voltage drops.

(5) The provision of novel overhead type electrical distribution systems which may be more inexpensively provided with effective lightning protection that has heretofore been possible.

(6) In conjunction with the preceding object, the provision of novel overhead type electrical distribution systems which employ shorter utility poles than prior art distribution systems with lightning protection.

(7) The provision of novel electrical distribution systems having lower impedances and greater current carrying capacity than prior art systems employing conductors of comparable size.

(8) The provision of novel electrical distribution systems which have fewer outages than the systems heretofore employed.

(9) The provision of novel electrical distribution systems having a high degree of flexibility and in which a wide variety of circuit components can be utilized.

Other objects and further novel features of the present invention will become more fully apparent from the appended claims and as the ensuing detailed description and discussion proceeds in conjunction with the accompanying drawing, in which:

FIGURES 4 and 5 are, respectively, front and side elevations of an alternate pole construction which may be employed in the system of FIGURE 1;

Figure 1:
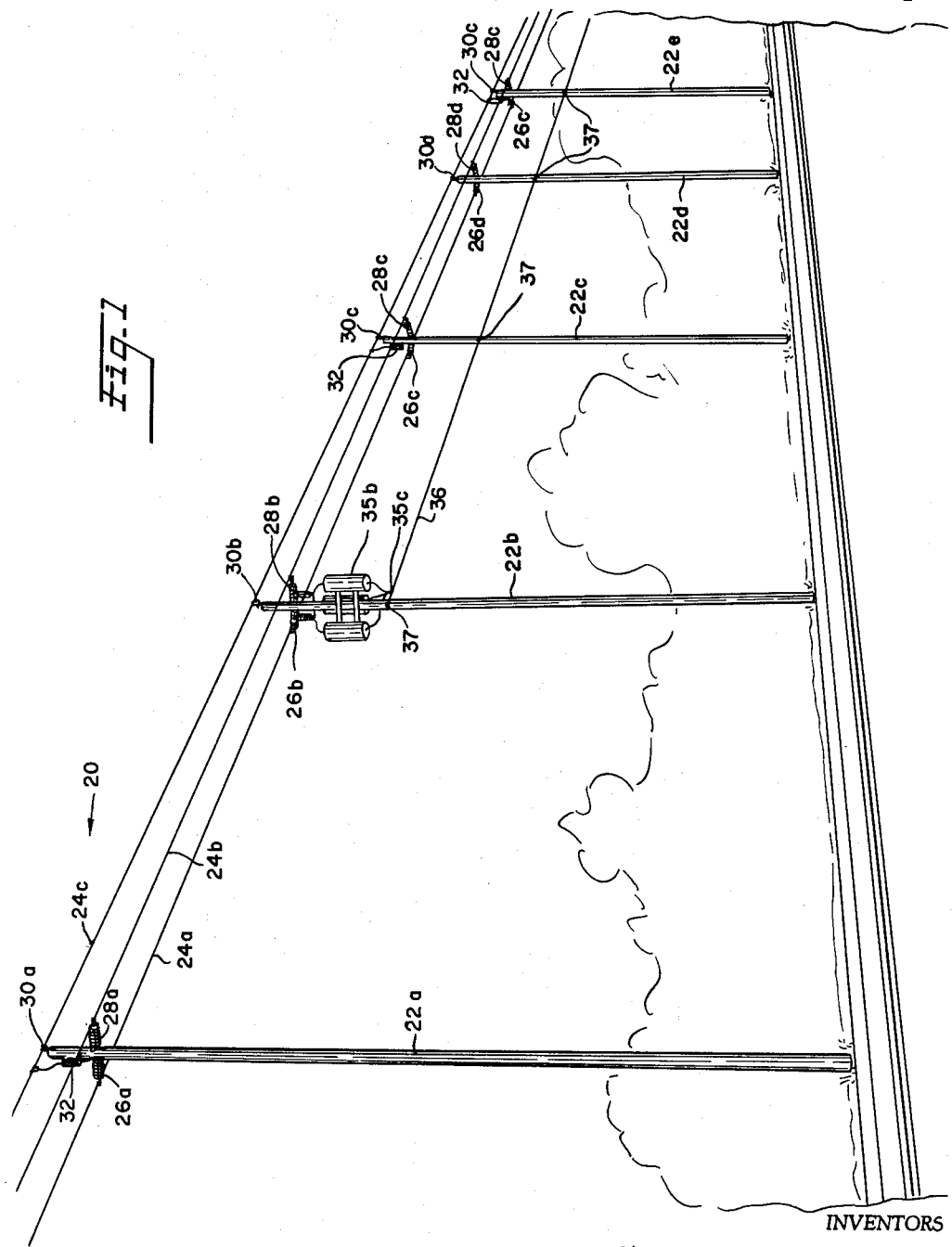
FIGURE 1 is a perspective view of an electrical distribution system constructed in accordance with the principles of the present invention.
Figure 3:
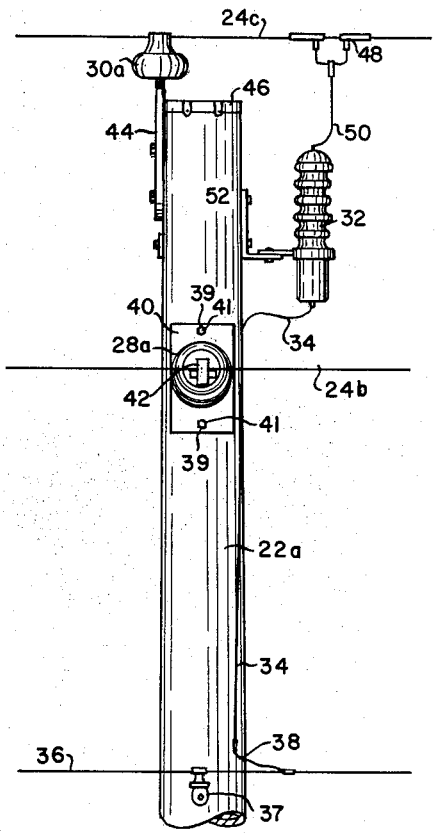
FIGURE 3 is a side elevation of the pole construction of FIGURE 2.

Referring now to the drawing, FIGURE 1 illustrates an exemplary electrical power distribution system 20 constructed in accordance with the principles of the present invention. Distribution system 20 includes a plurality of utility poles 22a–e from which primary conductors 24a–c are suspended by post-type insulators 26a–e and 28a–e and pin-type insulators 30a–e, all fixed to the utility poles 22a–e adjacent their upper ends. Conductor 24c is connected to ground through lightning arresters 32 and ground conductors 34 (see FIG. 3) at alternate ones of the utility poles 22. The three conductors 24a–c each carry one phase of three-phase electrical power at a voltage of 2–35 kv., a common voltage being 13.8 kv. The distribution voltage is lowered by three pole-mounted single phase distribution transformers 35a–c to a voltage directly usable by the consumer. For residential and light commercial service areas the transformer output is commonly 208 or 240 volts, making 208 volt three-phase and 120–240 volt single phase power available to the consumer. The secondaries of transformers 35a–c are connected to secondary conductors in a conventional cable bundle 36 which is suspended from poles 22a–e by attachments 37 and constitutes a secondary distribution system through which the 208/120 volt electrical power is delivered from the distribution transformers to the consumers. As is shown in FIGURE 3, cable bundle 36 may also be grounded through a lead 38 connected to ground conductor 34.

Figure 2:
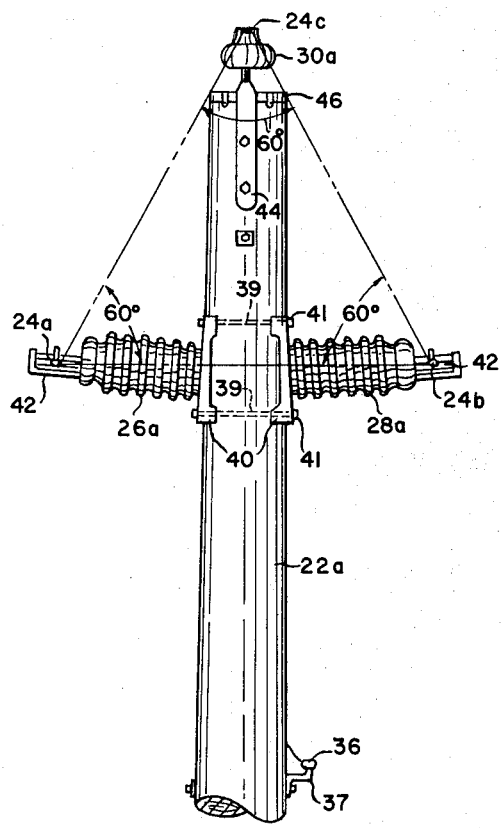
FIGURE 2 is a front elevation of the pole construction employed in the system of FIGURE 1.

As is best shown in FIGURE 2, the two post-type insulators 26a and 28a by which primary conductors 24a and 24b are supported are mounted adjacent the upper end of pole 22a in back-to-back relationship by bolts 39 which extend through the base plates 40 of insulators 26a and 28a and are secured in place by nuts 41. Bolts 39 are preferably fabricated so that they will withstand a force of at least 1000 pounds imposed on the outer ends of insulators 26a and 28a by the weight of conductors 24a and 24b, wind forces, and the like. Base plates 40 are preferably, but not necessarily, of the adjustable type disclosed in copending application No. 251,846, filed January 16, 1963, by Harold C. Leonard, for Adjustable Insulator Support. Primary conductors 24a and 24b are fastened in conventional clamping devices 42 fixed to the outer or outboard ends of insulators 26a and 28a which, as best shown in FIGURE 2, support primary conductors 24a and 24b in substantially the same horizontal plane.

The pin-type insulator 30, to which primary conductor 24c is fastened by a conventional tie wire (not shown), is supported on a bracket 44 bolted to the upper end of pole 22a and extends upwardly beyond the top of the pole. A metal cap 46 is bolted or otherwise fixed to the top of pole 22a to prevent moisture from attacking the pole and causing deterioration.

Post-type insulators with conventional non-adjustable base plates are available from several commercial sources.

With continued reference to FIGURE 2, the length of post-type insulators 26a and 28a and the location at which these insulators are bolted to post 22a is preferably so coordinated that the three primary conductors 24a–c are, as nearly as possible at the corners of an equilateral triangle and, therefore, substantially equidistantly spaced from each other. The distance between conductors 24a–c will vary depending upon the voltage carried by the conductors, but, in any event, must meet the minimum requirements of the American Standard Association for the voltage they carry and, in most cases, must be sufficiently large that a lineman can safely climb between primary conductors 24a and 24b to make connections to the uppermost primary conductor 24c. In one practical application, it was found that a distance of 35 inches between conductors provided adequate spacing for a 13.8 kv. distribution system.

Since the three conductors 24a–c of the primary distribution system are equidistantly spaced, the voltage drop through the three conductors is equal. Therefore, the novel system of the present invention provides three-phase power with uniform voltage in all phases which is highly beneficial since such uniform voltage minimizes the heating of electrical motors.

Moreover, the necessity of transposing the primary conductors at equal intervals as is done in conventional overhead systems to minimize variations in phase voltages is eliminated together with the attendant problem of preventing shorting between the conductors at the transposition points.

The equidistant spacing between the primary conductors in the present invention also substantially reduces the total impedance of the system. The voltage drop through a distribution system, while not strictly proportional to, is reflected by the equivalent phase spacing of the system which is determined by the formula $$\sqrt[3]{A \times B \times C}$$

where A, B, and C represent the distances between the three primary conductors of the system. Thus, assuming for purposes of illustration that the minimum distance between conductors is to be 30 inches, the equivalent phase spacing of the distribution system $$20 = \sqrt[3]{30 \times 30 \times 30} = 30$$

For a cross arm type system with the same minimum spacing between primary conductors, the equivalent phase spacing is $$\sqrt[3]{30 \times 30 \times 60} = 37.80$$

or more, at least 25% greater than that of the present invention. It will be apparent, therefore, that the present system has a substantially lower voltage drop and, therefore, a lower impedance than the conventional system. This reduction in the impedance of the system is of importance since it increases the capacity of the system. For example, with 336 ACSR conductors, the novel system provided by the present invention has a capacity approximately 7% greater than a conventional system in which the conductors are mounted on pole-supported cross arms.

In the conventional overhead power distribution system in which the power carrying conductors are mounted on cross arms, lightning protection is generally provided by a fourth, deenergized, grounded conductor supported above the primary conductors. A bolt of lightning, impinging upon the conventional system, is conducted away through the shielding conductor, preventing the lightning bolt from striking and damaging the primary conductors. Such shielding is most effective when the primary conductors are disposed directly below the shielding conductor. However, an acceptable degree of protection is afforded so long as the included angle between the planes including the shielding conductor and the outermost of the current carrying primary conductors does not exceed about 90 degrees.

In the present invention, the use of the fourth or shielding conductor, which serves no useful current carrying function and which increases the cost of the distribution system, is unnecessary. With particular reference to FIGURE 2, the upper conductor 24c serves in a dual capacity, carrying one phase of the three-phase power distributed by system 20 and, in addition, shielding the lower conductors 24a and 24b. Since the three primary conductors 24a–c are equidistantly spaced as in the preferred illustrated embodiment of applicants' invention, the included angle between the plane including the centerlines of conductors 24a and 24c and the plane including the centerlines of conductors 24b and 24c is 60°, well within the limit of 90° beyond which the shielding provided by upper conductor 24a is ineffective.

Turning now to FIGURE 3, the upper conductor 24c is connected to lightning arrester 32 which, for 13.8 kv. system, preferably has a rating of about 10 kv., by a conventional clamp 48 and a lead 50. Lightning arrester 32 is supported on a bracket 52 bolted to pole 22a adjacent its upper end and is connected to ground through the grounded conductor 34 referred to above. The lower end of conductor 34 is, as is conventional, connected to a butt coil (not shown) nailed to pole 22a adjacent its lower end. If the ground resistance is unacceptably high, one or more ground rods (not shown) may be employed to reduce the ground resistance to an acceptable level. Lightning arrester 32 may be of any commercially available construction, such as the "De-ion" type arrestor manufactured by Westinghouse Electric Corp., and may be either the valve or the explusion type.

Distribution system 20 has a high impulse withstand to flashover between the upper and lower conductors which is enhanced by the fact that the creosoted wooden utility pole 22a is interposed between insulator 30 and insulators 26 and 28. In the 4 microsecond range, the impulse withstand level of the present invention is comparable to that of the standard shielded construction described above. In the 16 microsecond range, the voltage withstand of system 20 is superior to that of the standard shielded system. In addition, the preferred phase spacing of 35 inches between the primary conductors in system 20 is substantially larger than the 29 inch minimum separation for standard shielded construction. Because of this increased spacing, system 20 is less susceptible to outages caused by short circuit galloping and high winds than the prior art systems.

Figure 8:
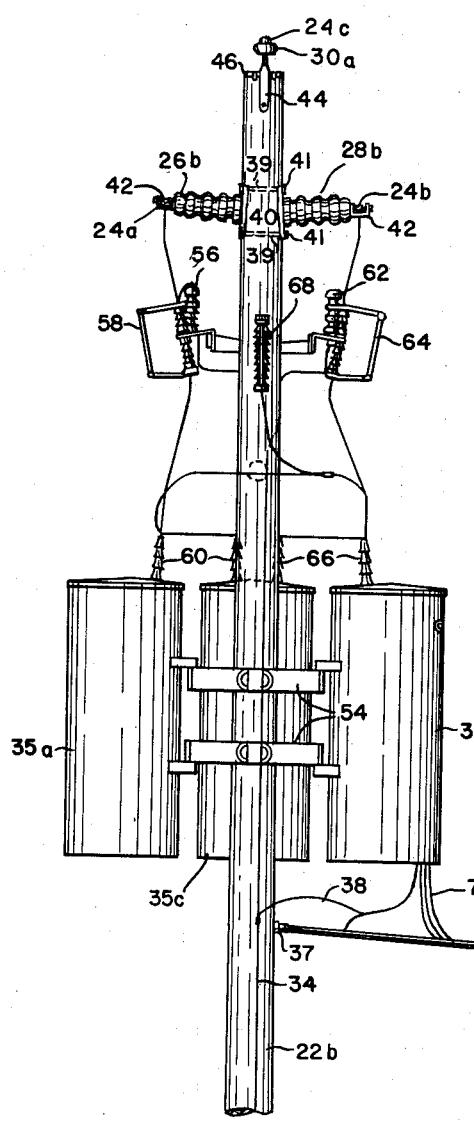
FIGURES 8 and 9 are, respectively, front and side elevations of a pole construction employed in the system of FIGURE 1, illustrating the connections from the three primary conductors to a set of distribution transformers.
Figure 9:
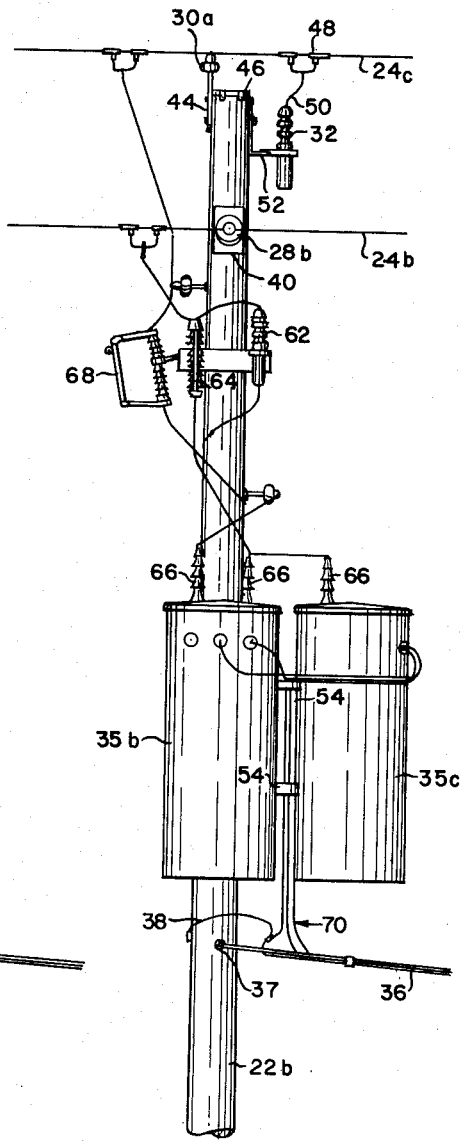

Poles 22b–e are substantially identical to pole 22a except that no lightning arrester is mounted on pole 22d and pole 22b supports the transformers 35a–c employed to lower the voltage of the electrical power carried by primary conductors 24a–c to a level directly usable by the consumer. As is shown in FIGURES 8 and 9, transformers 35a–c are supported from utility pole 22b by brackets indicated generally by reference character 54 which are of conventional construction and form no part of the present invention. Primary conductor 24a, as is best shown in FIGURE 8, is connected through a lightning arrester 56, which may be of the same type as the lightning arrester 32 described above, and a fuse cutout 58 to transformer bushing 60 of transformers 35a and 35b. Primary conductor 24b is similarly connected through lightning arrester 62 and fuse cutout 64 to transformer bushings 66 of transformers 35b and 35c. The remaining primary conductor, 24c, is connected through fuse cutout 68 to transformer bushing 60 of transformer 35a and transformer bushing 66 of transformer 35b. The latter conductor, 24c, is grounded through lightning arrester 32 in the manner described above. It will be apparent, therefore, that when transformers are employed, the primary conductors suspended by the lower insulators 26 and 28 are grounded through lightning arresters in addition to the upper conductor 24c to protect the transformers. Fuse cutouts 58, 64 and 68 are employed to protect transformers 35a–c from overloads and to permit the transformers to be removed from the distribution system circuit in which they are interposed without deenergizing the circuit. They may be of any desired commercially available construction such as those manufactured by Westinghouse Electric Corp.

The secondary windings (not shown) of transformers 35a–c are connected through conductors indicated generally by reference character 70 to secondary conductors in cable bundle 36. By tapping two of the secondary conductors, single-phase 120 volt lamp power may be obtained; by tapping all three of the secondary conductors, three-phase 208 volt motor power may be obtained.

Since the lower primary conductors 24a and 24b are typically separated by an interval on the order of 35 inches, the lineman may readily climb upward between these conductors to make or repair the connections to the upper conductor 24c or to repair or replace lightning arresters 32.

In the exemplary system illustrated in FIGURE 1 lightning arresters 32 are connected to primary conductor 24c at alternate poles 22a, 22c, and 22e. Depending upon the particular installation, a greater spacing may be desirable or, alternatively, a lightning arrester may be advantageously connected to primary conductor 24c at each of the utility poles. Or, in some urban locations, the use of lightning arresters may be dispensed with altogether.

One of the important features of distribution system 20 is that it has a substantially more attractive appearance than the systems heretofore employed in which the primary conductors were mounted on a horizontally extending cross arm since the clutter of cross arms, cross arm braces, and shielding wire associated with the conventional prior art systems is eliminated. Moreover, since the superposed shielding conductor is not employed, utility poles having a height on the order of 5 ft. less than has heretofore been possible may be employed. This, together with the reduction in the number of components employed and the ease with which system 20 may be erected makes this system comparable in cost to, or even less expensive than, the prior conventional systems.

The pole construction shown in FIGURES 4 and 5 is substantially identical to that shown in FIGURES 2 and 3 except that pin-type insulators 72 and 74 are substituted for the post-type insulators 26 and 28 described above. As is best shown in FIGURE 4, the pin-type insulators 72 and 74 which suspend primary conductors 24a and 24b from utility pole 22a are mounted on opposite ends of an elongated bolt 76 which extends through a horizontal bore 78 in the utility pole. Bolt 76 is secured in place by washers 80 and by nuts 82 threaded on bolt 76 on opposite sides of pole 22a'. The length of bolt 76 and its location relative to the top of the pole are preferably coordinated so that conductors 24a, 24b, and 24c are equidistantly spaced. Conductors 24a–c may be fastened to insulators by tie wires (not shown).

Except for the differences discussed above, a system employing a pole construction of the type shown in FIGURES 4 and 5 may be identical to and will have all the advantages of a system employing the pole construction shown in FIGURES 2 and 3.

Figures 6, 7:
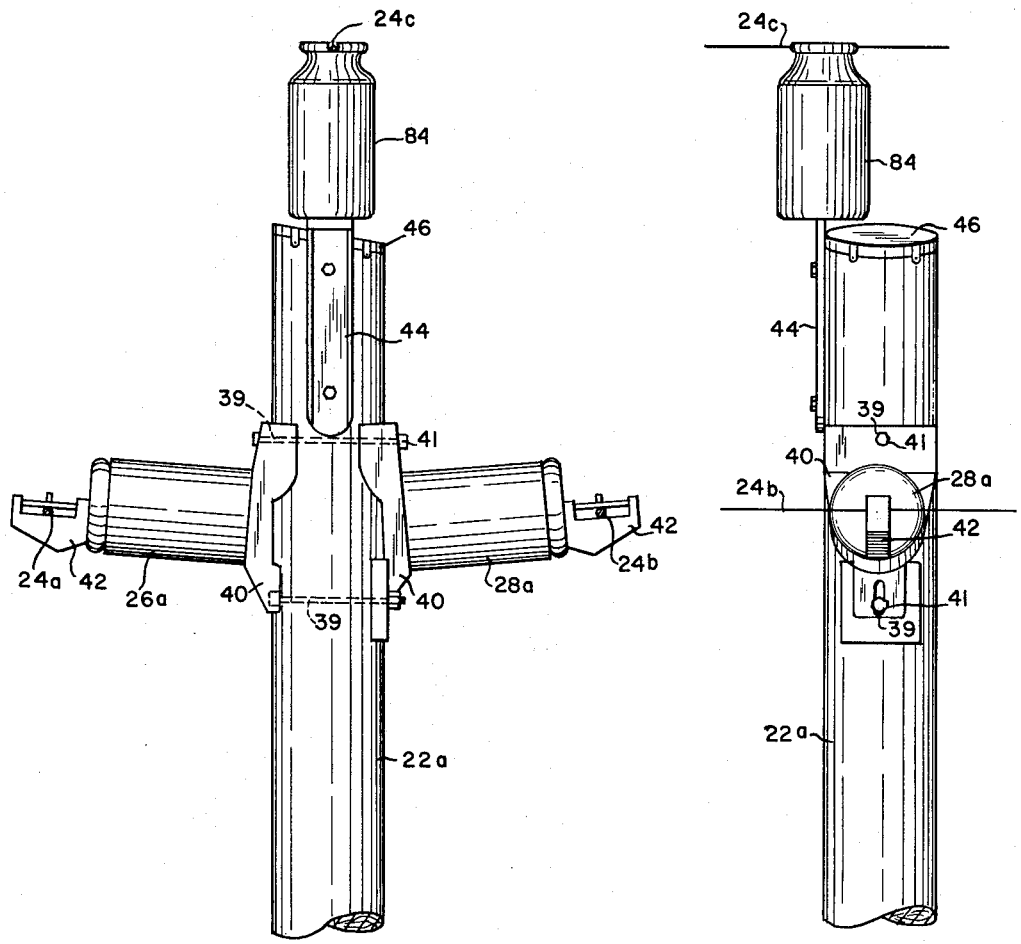
FIGURES 6 and 7 are, respectively, front and side elevations of yet another pole construction which may be employed in the system of FIGURE 1.

FIGURES 6 and 7 show yet another pole construction which may be substituted for the pole construction illustrated in FIGURES 2 and 3. In the pole construction of FIGURES 6 and 7 a post-type insulator 84 is employed to support the upper of the three primary conductors 24c rather than a pin-type insulator as in FIGURES 2 and 3. Again, the size and disposition of the three insulators 26, 28, and 84 are so co-ordinated that the spacing between primary conductors 24a, 24b, and 24c is substantially equal. In this embodiment the post-type insulators 26, 28, and 84 are smooth cylinders, a configuration which may be preferable for some applications of the present invention. Although lightning arresters are not shown in FIGURES 6 and 7 it is to be understood that lightning protection may be provided when a system utilizing this type of pole construction is employed.

From the above description, it will be apparent that a wide variety of different types of insulators may be employed in the novel system provided by the present invention, adding greatly to the flexibility and utility of this system. In addition, although bare conductors will probably be most commonly employed, in special applications systems constructed in accordance with the principles of the present invention and utilizing tree wire and semi-insulating conductors may advantageously be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a three phase electrical power distribution system:
   (a) a plurality of distribution poles;
   (b) three primary phase conductors extending between said poles; and
   (c) means suspending said conductors from said poles with each of said conductors substantially equidistantly spaced from the other two conductors and with two of said conductors in substantially the same horizontal plane and on opposite sides of the pole, comprising, at each pole:
   (d) first and second insulators;
   (e) means securing said first and second insulators in a substantially horizontal orientation to the associated pole, said insulators being oriented in oppositely extending back-to-back relationship and in substantially the same horizontal plane;
   (f) means fixed to the outboard end of each of said insulators supporting said first and second conductors; and
   (g) a third insulator secured to the pole and spaced above and substantially midway between said first and second conductors for supporting the third of said conductors.

2. The system as defined in claim 1:
   (a) wherein said third conductor is arranged to form a cone of protection encompassing said first and second conductors, whereby lightning impinging upon said system will strike said third conductor but not said first and second conductors; and
   (b) including at least one grounded lightning arrestor connected to said third conductor.

3. The system as defined in claim 2, wherein grounded lightning arrestors are connected to said third conductor at selected ones of said poles.

4. The system as defined in claim 2, wherein grounded lightning arrestors are connected to said third conductor at alternate ones of said poles.

5. The system as defined in claim 2, wherein a grounded lightning protector is connected to said third conductor at each of said poles.

6. The system as defined in claim 2, wherein said first and second conductors are ungrounded.

7. In a three phase electrical power distribution system:
   (a) a plurality of distribution poles;
   (b) three primary phase conductors extending between said poles; and
   (c) means suspending said conductors from said poles with each of said conductors substantially equidistantly spaced from the other two conductors and with two of said conductors in substantially the same horizontal plane and on opposite sides of the poles, comprising, at each pole:
   (d) first and second insulators secured in back-to-back relationship in substantially the same horizontal plane to the associated pole adjacent its upper end, said insulators having an elongated, generally cylindrical configuration and substantially spanning the gap between the associated conductor and the distribution pole; and
   (e) a third insulator secured to said pole and spaced above and substantially midway between said two conductors.

8. For a three phase electrical power distribution system or the like, a pole unit comprising:
   (a) a distribution pole; and
   (b) means for suspending three primary phase conductors from said pole with the conductors at the points of an isosceles triangle and with two of said conductors in substantially the same plane and equally spaced from said pole on opposite sides thereof, comprising:
   (c) first and second insulators;
   (d) means securing said first and second insulators in a substantially horizontal orientation to the associated pole, said insulators being oriented in oppositely extending back-to-back relationship and in substantially the same horizontal plane;
   (e) means fixed to the outboard end of each of said insulators for supporting said first and second conductors whereby said first and second insulators are disposed between said first and second conductors and space said conductors from said pole; and
   (f) a third insulator secured to the pole and spaced above and substantially midway between said first and second conductors for supporting the third of said conductors;
   (g) said first, second, and third insulators having longitudinal centerlines intersecting a horizontal line through the center of said pole.

9. For a three phase electrical power distribution system or the like, a pole unit comprising:
   (a) a distribution pole; and
   (b) means for suspending three primary phase conductors from said pole with the conductors at the points of an isosceles triangle and with two of said conductors in substantially the same plane and equally spaced from said pole on opposite sides thereof, comprising:
   (c) first and second insulators;
   (d) means supporting said first and second insulators from the associated pole, said insulators being oriented in oppositely extending back-to-back relationship and in substantially the same horizontal plane;

(e) means fixed to the outboard end of each of said insulators for supporting said first and second conductors whereby said first and second insulators are disposed between said first and second conductors and space said conductors from said pole;

(f) means at the level of said insulator supporting means and comprising at least one horizontally extending bolt for securing said insulator supporting means to the pole; and (g) a third insulator secured to the pole and spaced above and substantially midway between said first and second conductors for supporting the third of said conductors;

(h) said first, second, and third insulators having longitudinal centerlines intersecting a horizontal line through the center of said pole.

References Cited in the file of this patent

UNITED STATES PATENTS

| 224,580 | Chinnock | Feb. 17, 1880 |
| 1,867,394 | Acly | July 12, 1932 |
| 1,934,308 | Hoit | Nov. 7, 1933 |
| 2,022,386 | Pittman | Nov. 26, 1935 |
| 2,241,739 | Schlosser | May 13, 1941 |

FOREIGN PATENTS

| 322,891 | Great Britain | June 5, 1929 |
| 355,906 | Great Britain | Sept. 3, 1931 |
| 487,710 | France | July 23, 1918 |

OTHER REFERENCES

Saddock: "Electrical World," Sept. 25, 1961 (pages 42–45).